United States Patent
van Schyndel et al.

(10) Patent No.: US 9,961,917 B2
(45) Date of Patent: May 8, 2018

(54) BREWING SYSTEM

(71) Applicants: Jaime van Schyndel, Arlington, MA (US); Patrick Greer, Arlington, MA (US)

(72) Inventors: Jaime van Schyndel, Arlington, MA (US); Patrick Greer, Arlington, MA (US)

(*) Notice: Subject to any disclaimer, the term of this patent is extended or adjusted under 35 U.S.C. 154(b) by 165 days.

(21) Appl. No.: 15/162,002

(22) Filed: May 23, 2016

(65) Prior Publication Data

US 2016/0338522 A1  Nov. 24, 2016

Related U.S. Application Data

(60) Provisional application No. 62/165,917, filed on May 23, 2015.

(51) Int. Cl.
  *A47J 31/00* (2006.01)
  *A23F 5/26* (2006.01)
  *A47J 31/46* (2006.01)

(52) U.S. Cl.
  CPC ............ *A23F 5/262* (2013.01); *A47J 31/002* (2013.01); *A47J 31/467* (2013.01)

(58) Field of Classification Search
  CPC .......... A47J 31/00; A47J 31/46; A47J 31/005; A23F 5/26; A23F 5/262
  See application file for complete search history.

(56) References Cited

U.S. PATENT DOCUMENTS

| | | | |
|---|---|---|---|
| 6,399,136 B1* | 6/2002 | Watkins, Jr. | A23F 5/243 426/521 |
| 2006/0016345 A1* | 1/2006 | Paloheimo | A23F 5/243 99/279 |
| 2013/0295244 A1* | 11/2013 | Reyhanloo | A47J 31/36 426/231 |
| 2014/0076168 A1* | 3/2014 | Lin | A47J 31/057 99/293 |

* cited by examiner

*Primary Examiner* — Hoa V Le
(74) *Attorney, Agent, or Firm* — Bay State IP, LLC

(57) ABSTRACT

A cold brewing coffee device that produces coffee without any suspended solids in the product. The devices uses a false bottom in the initial tank to hold the coffee beans and water is pumped between the initial tank and a second tank. Using an inverted P trap in the piping allow for reduced suspended solids in the final product. The end product is a high quality cold brewed beverage that is defined by the beverages clarity and lack of visible suspended solids, wherein the resulting product has a distinct look compared to other brewed beverages (i.e. producing a product that is cleaner than competing products without the need for a filter).

3 Claims, 30 Drawing Sheets

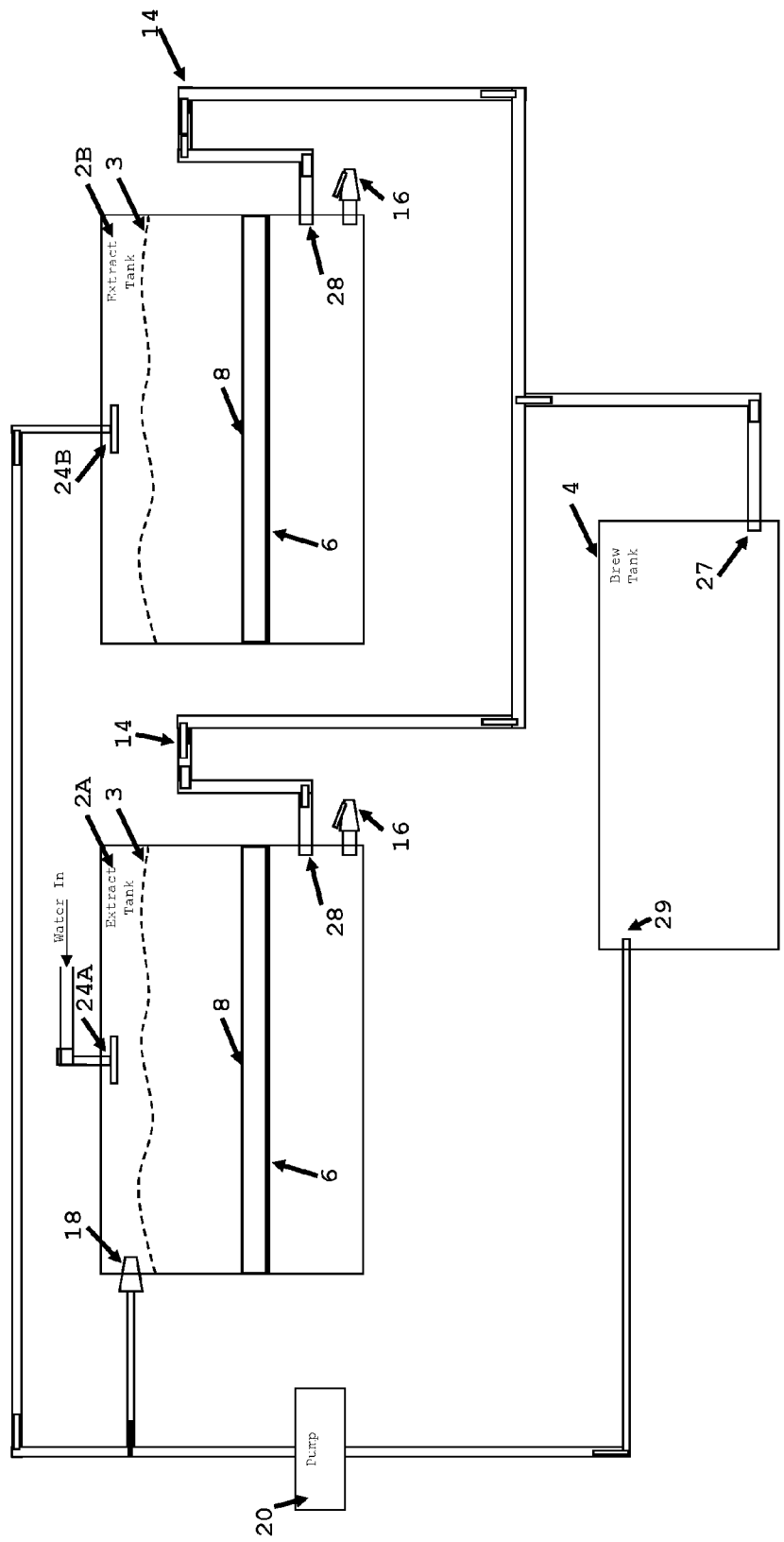

Cold Brewing Process

Staging

Preinfusion

Priming

Stilling

Drawdown

Dry Hopping Beer

Staging

FIG. 11 Preinfusion

Priming

Stilling

Drawdown

Cold Brewing Process

FIG. 16 Staging

Preinfusion

Priming

Stilling

Drawdown

Cold Brewing Process

Staging

FIG. 23 Preinfusion

Priming

Stilling

Drawdown

BREWING SYSTEM

CROSS REFERENCE TO RELATED APPLICATION

This applications claims priority to and takes the benefit of U.S. Provisional Patent Application No. 62/165,917 filed on May 23, 2015, the contents of which are herein incorporated by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Field of the Invention

The instant system and method relates generally to beverage brewing processes and apparatus, and more specifically to cold brewing coffee processes and apparatus.

Description of Related Art

Coffee brewing apparatuses are well known among the art. Traditionally coffee has been brewed using heated water. Water is heated in a vessel, then poured over a container full of ground coffee. While the water and grounds mix a coffee extract is produced which is filtered and delivered to the consumer. Improvements in the art have led to automated machines that complete this process in a single device.

Coffee has been conventionally brewed using hot or boiling water. Using hot or boiling is often used because it mixes with the grounds much quicker. One drawback of hot brewed coffee is that the taste can sometimes be acidic and harsh.

Coffee can also be brewed using cold water. Cold brewing coffee avoids the harsh and acidic taste that hot brewing coffee brings. A demand has arisen for cold brewed coffee due to the improved taste.

Other methods of cold brewing coffee including utilization of implements including cloth, paper and metal filters leave suspended solids in the liquid. These solids are visually unappealing and settle at the bottom of the container when it is stored.

SUMMARY OF THE INVENTION

The instant apparatus, as illustrated herein, is not anticipated, rendered obvious, or present in any of the prior art mechanisms, either alone or in any combination thereof. The present system and method relates to an improved apparatus for cold brewing coffee. The device and method suspended solids in cold brewed coffee and improves the art of coffee brewing.

Therefore, it is an object of the instant system to provide a system, method, process and accompanying apparatuses for brewing of beverages.

It is additionally an object of the instant system to provide a system, method, process and accompanying apparatuses for cold brewing of beverages.

It is one object of the instant system to provide a system for controlled brewing for several hours until the desired product has been created.

An additional object of the present system and method is to produce a brewed, and particularly a cold brewed, product without suspended solids.

It is an object of the present system and method is to have the highest yield of comparable brewing methods.

A further object of the present system and method is to provide a device that cold brews coffee that is easy to clean.

The cold brew coffee device comprises an extract tank, a brew tank, inverted P trap piping and pumped piping.

When assembled the extract tank comprises a tank with a false bottom, an outlet spout, and a lid. The lid has a mister in the center of it attached to a water supply.

There has thus been outlined, rather broadly, the more important features of the versatile systems, apparatuses and accompany methods for brewing, and particularly cold brewing, in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system and method in detail, it is to be understood that the system and method is not limited in its application to the details of construction and to the arrangements of the components set forth in the following description or illustrated in the drawings. The system and method is capable of other embodiments and of being practiced and carries out in various ways. Also, it is to be understood that the phraseology and terminology employed herein are for the purpose of description and should not be regarded as limiting.

These, together with other objects of the system and method, along with the various features of novelty, which characterize the system and method, are pointed out with particularity in the claims annexed to and forming a part of this disclosure. For a better understanding of the interactive systems, apparatuses and accompany methods, the operating advantages and the specific objects attained by usage, reference should be made to the accompanying drawings and descriptive matter in which there are illustrated preferred embodiments of the system and method.

BRIEF DESCRIPTION OF THE DRAWINGS

The system and method may be more completely understood in consideration of the following detailed description of the various embodiments of the system and method in connection with the accompanying drawings, in which:

FIGS. 1A-1E are several views of the completely assembled cold brewing system including the interworking accompanying device;

DETAILED DESCRIPTION OF THE SEVERAL EMBODIMENTS

Figure 1A:
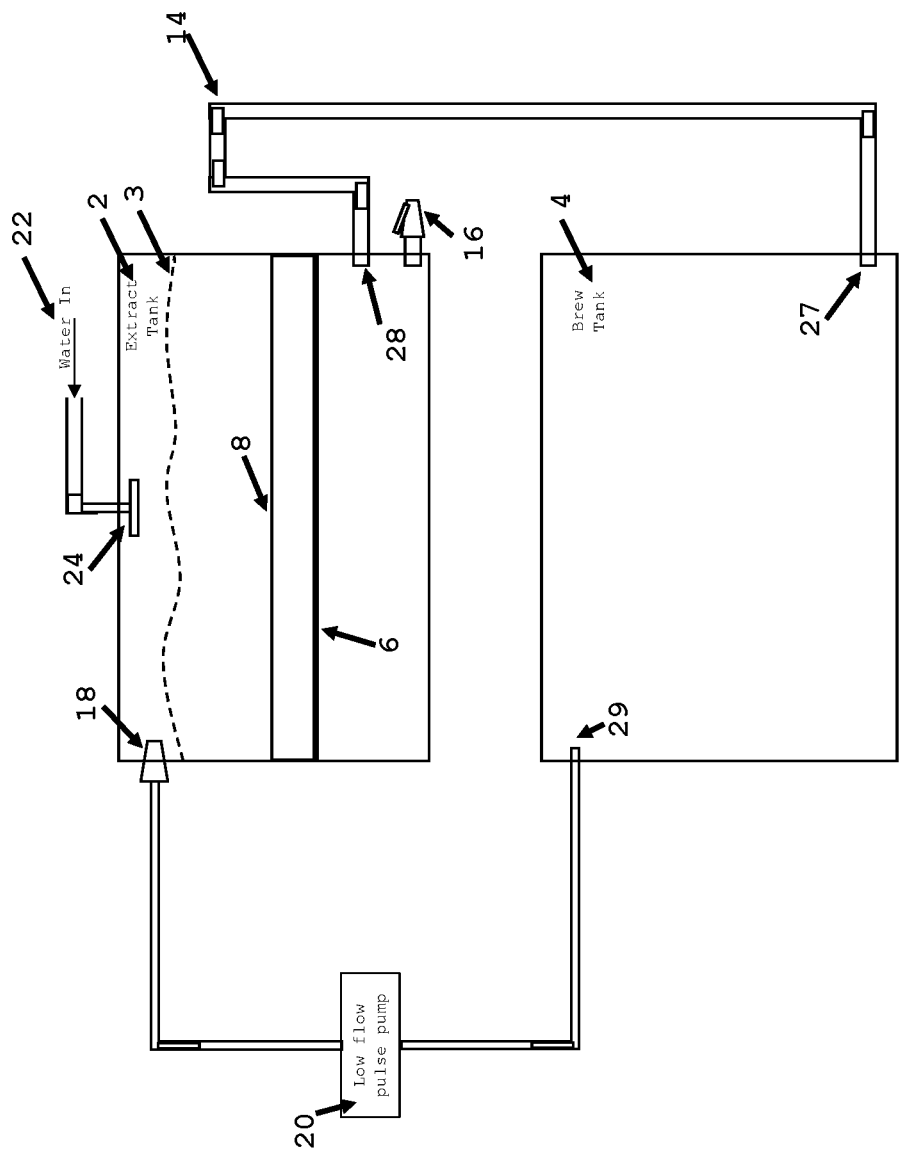

For the following defined terms, these definitions shall be applied, unless a different definition is given in the claims or elsewhere in this specification. All numeric values are herein assumed to be modified by the term "about", whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings wherein like reference numerals indicate like elements throughout the several views. The drawings, which are not necessarily to scale, depict illustrative embodiments of the claimed system and method.

Device for Cold Brewing Coffee

Referring to the figures, FIG. 1A illustrates one embodiment of a device for cold brewing coffee. The device is comprised of two interconnected tanks. The extract tank 2 is located above the Brew Tank 4. This embodiment of the extract tank 2 features a single false bottom 6, however other embodiments may have a plurality of false bottoms. Coffee beans are placed on top of the false bottom 6 to form a coffee bed 8. A sparge arm 18 is placed at about 90% of the fill level, however it may be place higher or lower. A sparge arm 18 is used in this embodiment, however other valves may be used to prevent overflow such as but not limited to a float valve. Water is also drained 28 from below the false bottom 6 to the brew tank 4. A spout 16 is placed below the false bottom 6 in the extract tank 2.

In the brewing arts, a sparge arm may include a sparge pipe used to sprinkle hot water over the malt, or other material, and is usually arranged to rotate above the tun. In one embodiment, a sparge pipe may include a horizontal perforated pipe used to sprinkle or spray water or other liquids. Sparge arms, and sparging generally, may decrease the amount of effort you must spend pouring sparge water into the lauter tun. In a simple embodiment, a sparge arm may be constructed from a perforated copper loop that lies on top of the grain in the lauter tun.

Additionally, in the brewing arts, and taking beer as an example herein, sparging is normally defined as the rinsing of the grain bed, or herein a medium such as coffee beans, to extract as much of the sugars from the grain as possible without extracting mouth-puckering tannins from the grain husks. In the instant apparatus, the sparge arm becomes a multipurpose apparatus to be utilized in different manners including a safety valve overflow device utilizing suction capabilities and a more standardized spraying mechanism located at the top of the extract tank 2.

A plurality of misters 24 is placed at the top of the extract tank 2, however the mister 24 may be placed elsewhere the extract tank 2 in other embodiments. Water is pumped 22 into the extract tank 2 through the plurality of misters 24 and the extract tank 2 is filled up to the water fill line 3.

Water from below the false bottom 6 is also driven into the brew tank 4 through a tube 28. During operation the brew tank 4 is filled with water. The tube 28 features an inverted portion 14 that raises to some point above the coffee bed 8. The tube 28 deposits water into the brew tank 4 near the bottom 27 of the brew tank 4.

Water from the brew tank 4 is drawn from the top of the brew tank 29 by a low flow pump 20. In this embodiment of the device the low flow pump 20 features a pulse operation setting however in other embodiments it may operate continuously. Water drawn from the brew tank 4 is deposited at the top of the extract tank 18. The water deposited 18 is ideally deposited through a sparge arm or float valve to prevent overflow, however any outlet can be used.

Figure 1B:
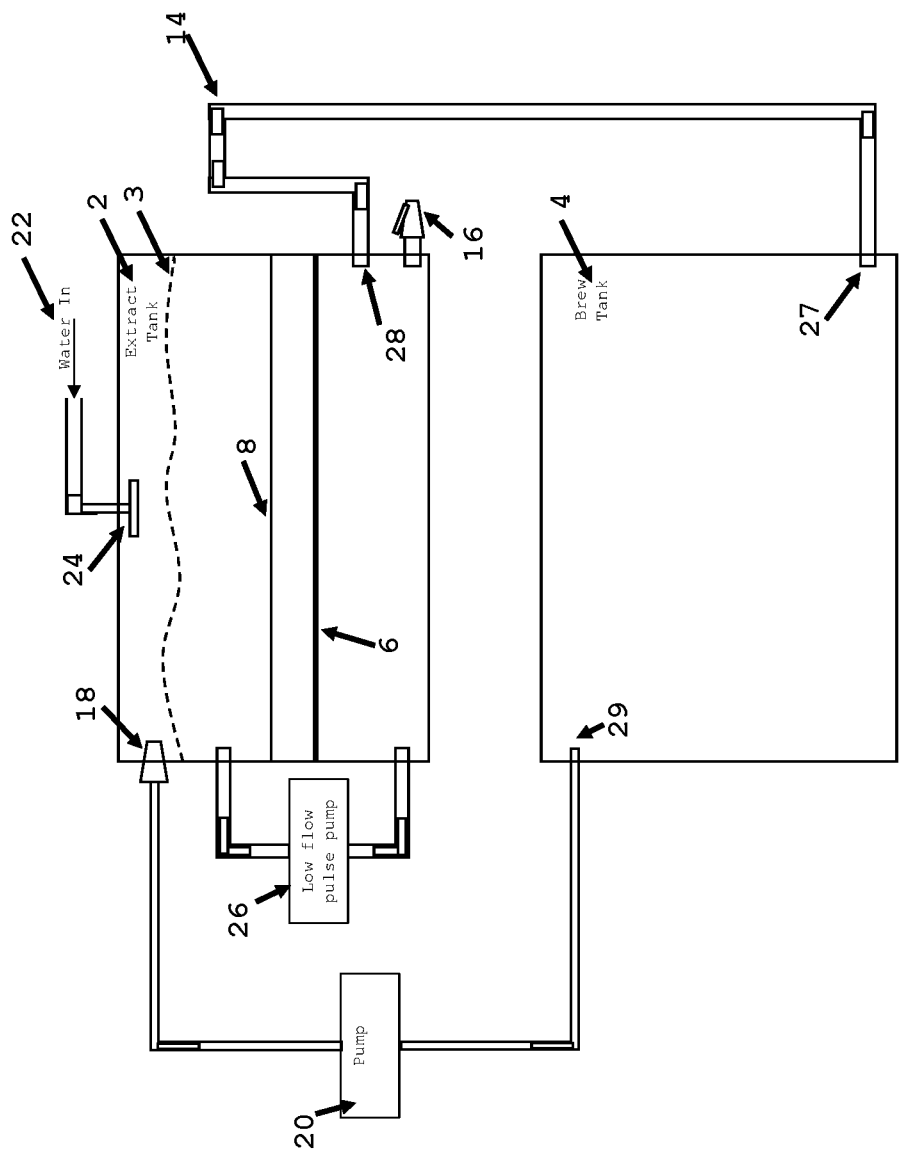

FIG. 1B illustrates another embodiment of the device. The device has an additional pump 26 that pumps liquid from below the false bottom 6 to above the coffee grounds 8. In this embodiment there is only one pump 26 that pumps liquid from below the false bottom 6 to above the coffee grounds 8, however the other embodiments may feature a plurality of pumps 26.

Figure 1C:
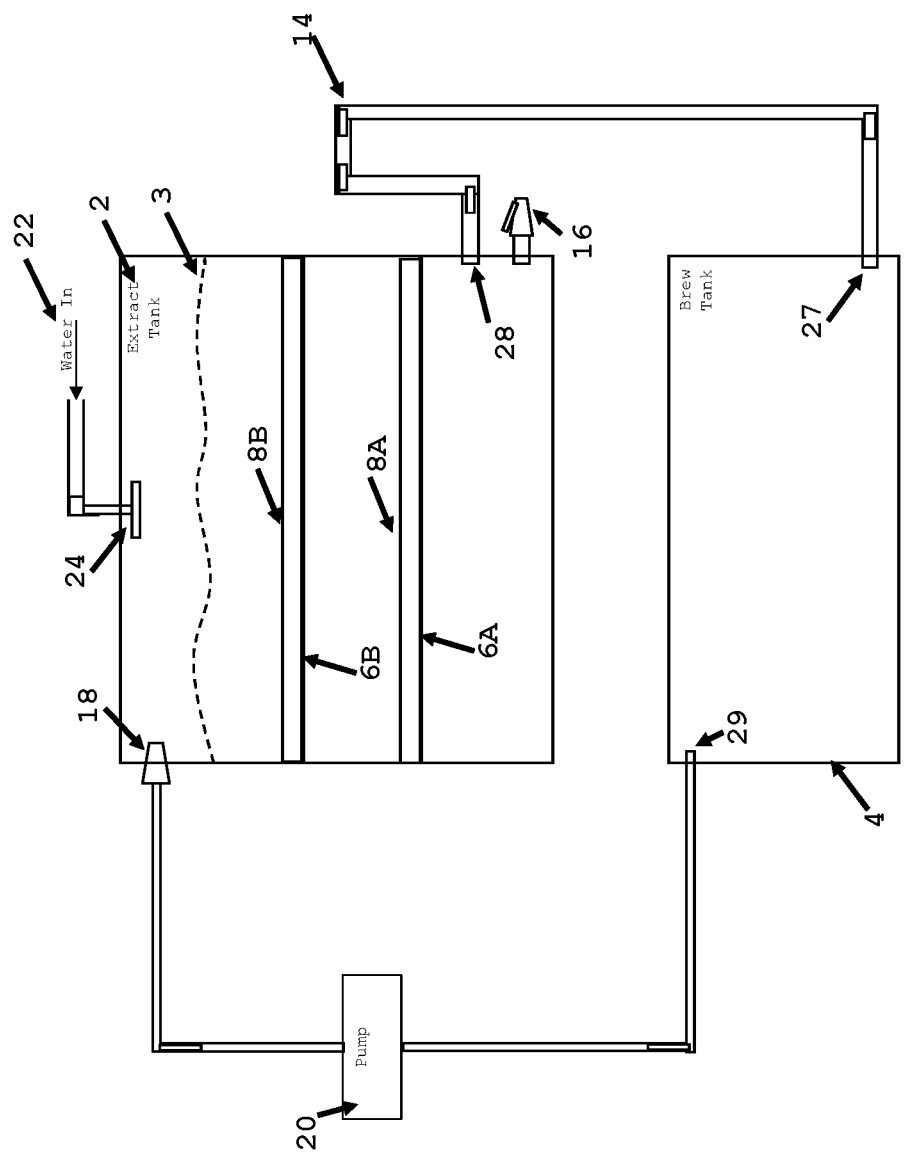

FIG. 1C illustrates another embodiment of the device featuring a two false bottoms 6. In this embodiment multiple false bottoms 6 are used to better control the concentration strength of the final product. This embodiment uses two false bottoms 6, however other embodiments may use a plurality of false bottoms. To operate this embodiment, the water level is brought to the bottom of the lowest false bottom 6A. Coffee grounds 8A are places on the lower false bottom 6A and pre-wet. Coffee grounds 8A are used in this embodiment, however other substances such as beer hops can be used. The next false bottom 6B is placed in the Extract Tank 2. Coffee grounds 8B are placed on this false bottom 6B and pre-wet. The inverted P-tube 14 must rise above the lowest false bottom 6A.

FIG. 1D illustrates another embodiment of the device featuring multiple Extract Tanks 2. In this embodiment Both Extract Tanks 2 deliver liquid to a single extract tank, however in other embodiments the liquid may be delivered to a plurality of tanks. In this embodiment liquid from the brew tank 4 is pumped 20 into a sparge arm in one Extract Tank 2A and back into the mister 24 in another Extract Tank 2B, however in other embodiments the liquid could be delivered to the Extract Tanks in a variety of ways. In this embodiment a single low flow pump 20 is used however in other embodiments a plurality of pumps may be used.

Figure 1E:
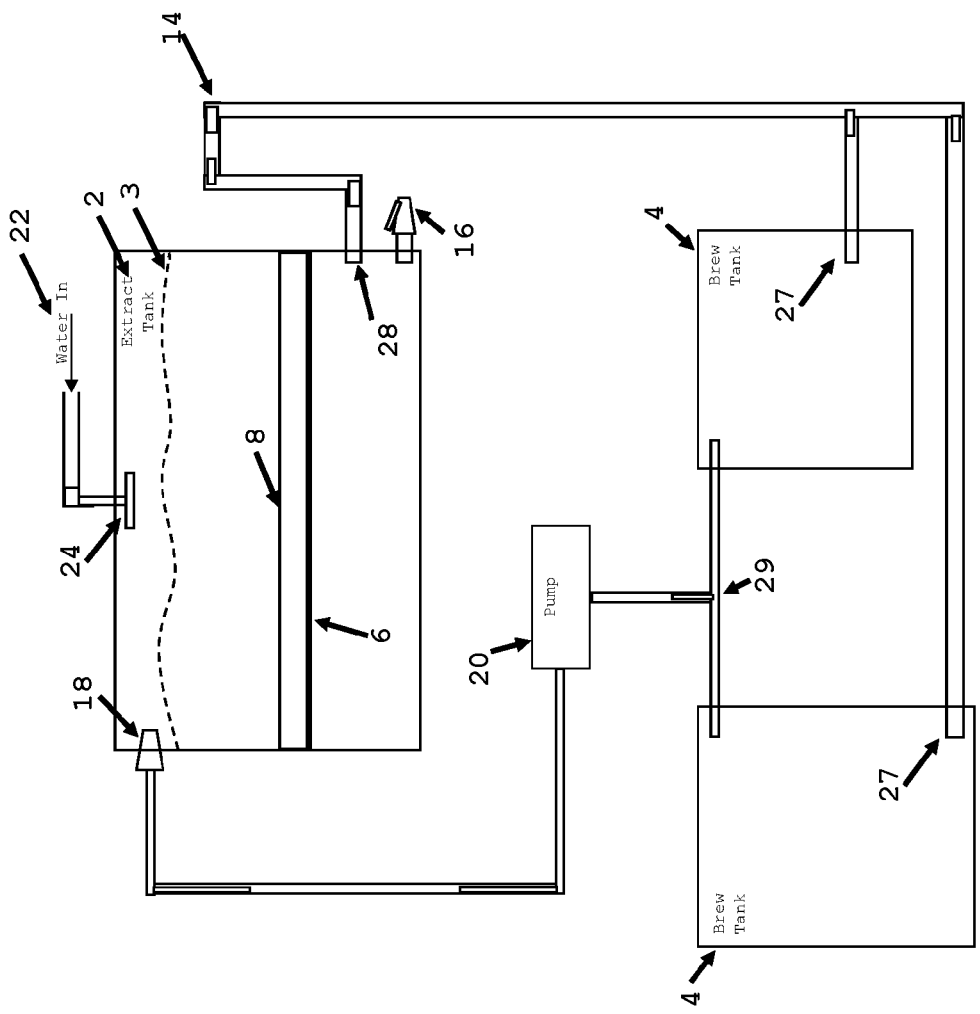

FIG. 1E illustrates another embodiment of the device featuring multiple Brew Tanks 4. In this embodiment liquid from both tanks 4 is pumped through a single pump, however in other embodiments a plurality of pumps may be used.

Figure 2:
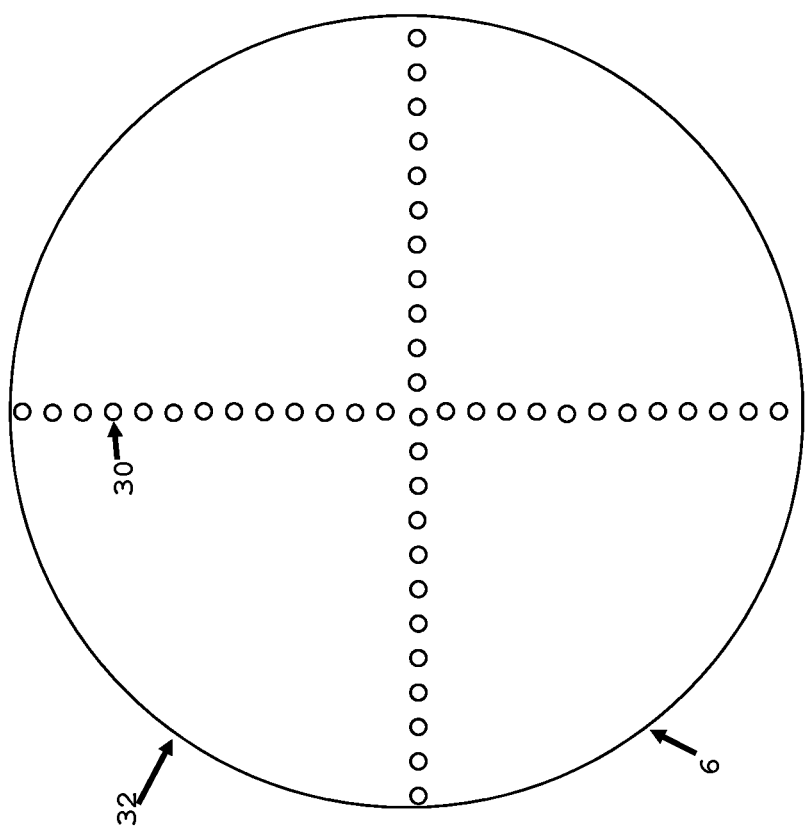
FIG. 2 is a top view of a false bottom for tank A.

FIG. 2 illustrates an embodiment of the false bottom 6. In this embodiment the false bottom 6 is circular 32, however in other embodiments the false bottom's shape 32 may vary depending on the shape of the extract tank 2. The false bottom 6 features small holes 30 that allow water to flow through the false bottom 6 but does not allow coffee bed 8 through. In this embodiment of the false bottom 6 the holes 30 are arranged in a cross shape however in other embodiments they may be arranged otherwise. In this embodiment the holes 30 are small circles however in other embodiments they may be shaped differently.

Process for Cold Brewing Coffee

Figure 3:
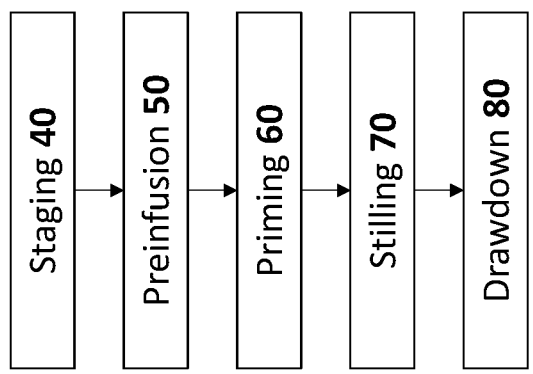
FIG. 3 is an overview of a cold brewing process.

FIG. 3 illustrates a process for cold brewing coffee. The process begins with staging the device 40. Next the coffee grounds are pre-infused 50. After that the cold brewing device is primed 60. Next the liquid is stilled 70. Finally the system is drawn down 80.

Figure 4:
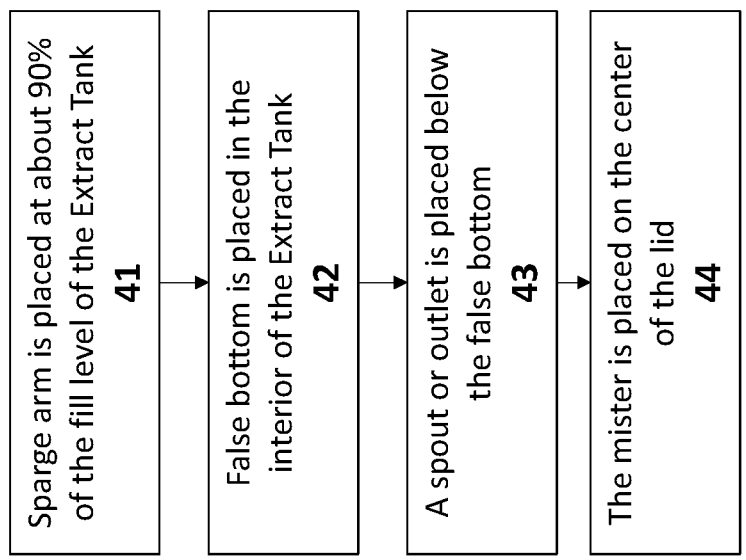
FIG. 4 is a staging process for a cold brewing process.

FIG. 4 illustrates a process for staging a coffee cold brew. In this embodiment initially, a sparge arm is placed at about 90% of the fill level of the extract tank 41, however another arm or valve may be used such as a float valve 18. A false bottom is placed in the interior of the extract tank 42. In this embodiment, a spout is placed on the extract tank below the false bottom 43, however in other embodiments another type of outlet may be used. Finally the mister is placed in the center of the lid for the extract tank.

Figure 5:
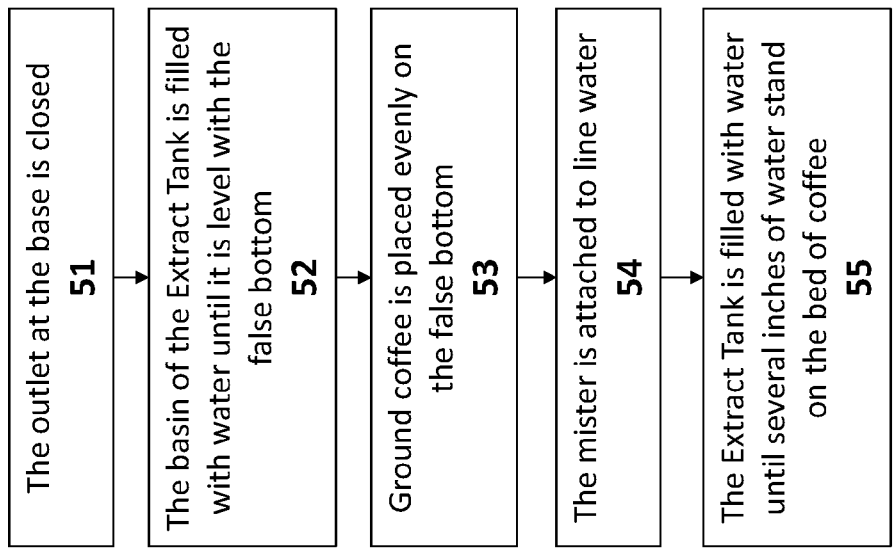
FIG. 5 is a pre-infusion process for a cold brewing process.

FIG. 5 illustrates a process of pre-infusing the liquid. First, the outlet 16 at the base of the extract tank 2 is closed 51. In this embodiment, the basin of the extract tank 2 is then filled with water 52 until the water is level with the false bottom 6, however in other embodiments others liquids such as beer or vodka could be used to be infused with coffee. Ground coffee 8 is placed on the false bottom 6, 53. The mister 24 is attached to a water source 54. The extract tank 2 is filled with water until the water level 3 is several inches above the coffee bed 8, 55.

Figure 6:
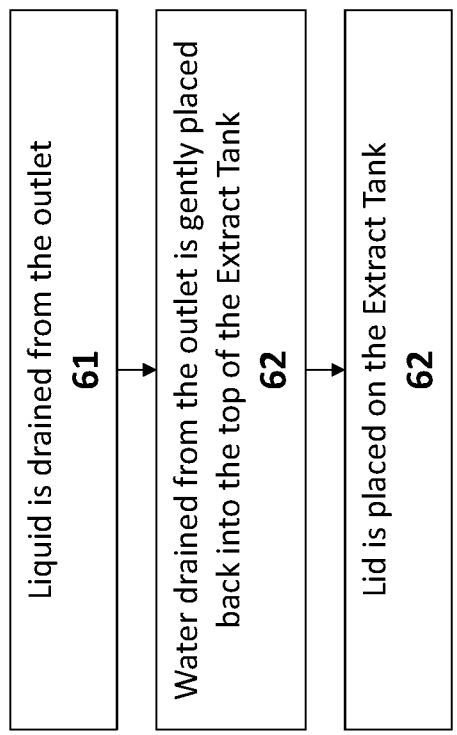
FIG. 6 is a priming process for a cold brewing process.

FIG. 6 illustrates a process for priming the cold brewing device. Liquid is drained from the extract tank 2 using the outlet 16, 61. The water drained from the outlet 16 is placed back into the extract tank 2, 62. The lid is placed on the Extract Tank 2, 63.

Figure 7:
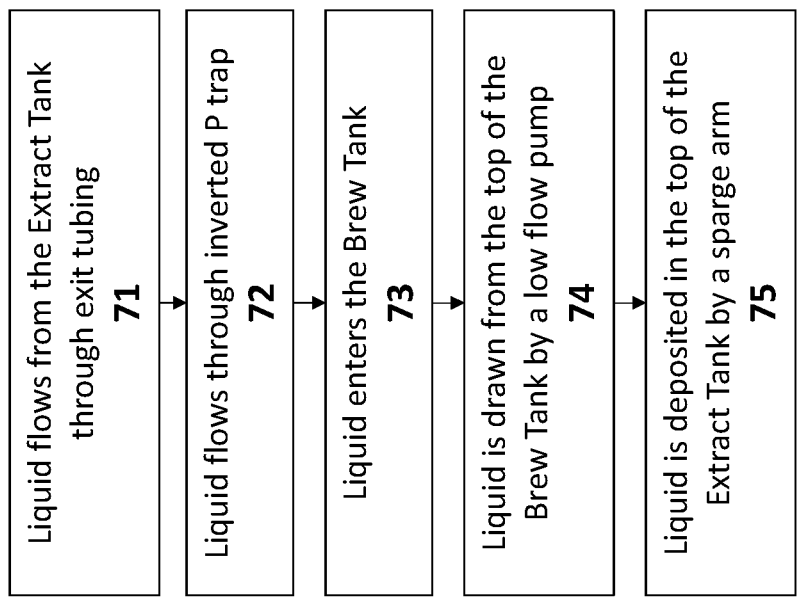
FIG. 7 is a stilling process for a cold brewing process.

FIG. 7 illustrates a process for stilling the liquid. The Brew Tank 4 must be placed below the extract tank 2. Liquid flows out the exit tube 28 in the extract tank 2, 71. Part of the exit tubing includes a P trap 14. Liquid flows through the P trap 14. The P trap 14 keeps the coffee bed 8 saturated with water. Liquid enters the brew tank 4, 73. Liquid is drawn from the top of the brew tank 4, 74. In this embodiment of the device the liquid is drawn by a low flow pump 20 set to a pulse setting, however in other embodiments the liquid can be drawn using other methods. It may be preferable to use a low flow pump 20 with a pulse setting to create a dwell time for better extraction. In this embodiment, liquid is deposited 75 at the top of the extract tank using a sparge arm 18, however the liquid may be deposited by other means as well.

Figure 8:
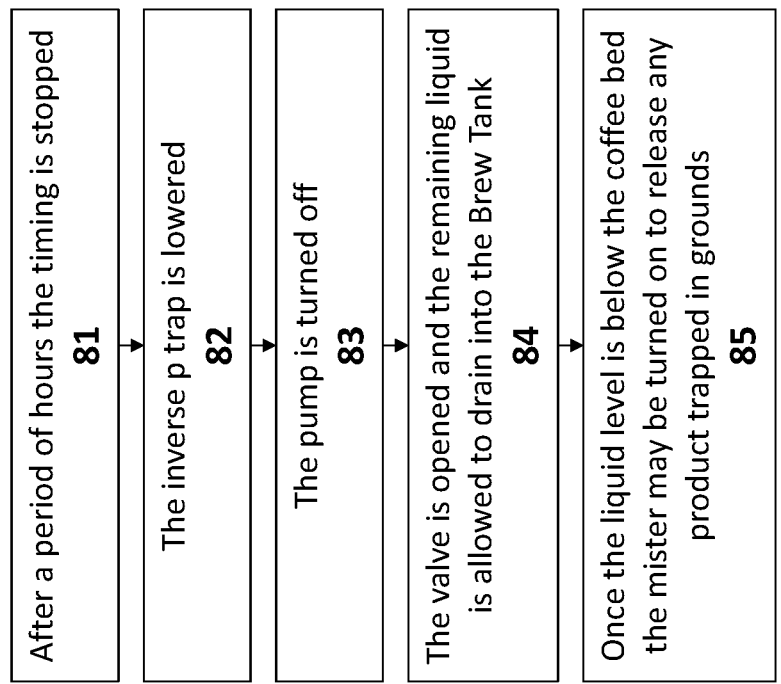
FIG. 8 is a drawdown process for a cold brewing process.

FIG. 8 illustrates a process for drawing down a cold brewing device. The period of time long enough to achieve the desired brew must elapse 81. Next the P trap 14 is lowered 82 and the pump 20 is turned off 83. Lowering the P trap 14 allows the liquid to drain directly into the brew tank 4. The valve 16 is opened 84 to allow any remaining in liquid to drain into the Brew tank 4. Once the liquid level is below the coffee bed 8 the mister 22 may be activated to release any product that may have been trapped in the grounds 85.

An additional object of the instant system is to introduce a brew tank optimally located in a position below the extract tank, wherein the inverted P trap piping connects the extract tank and the brew tank. The brew tank should optimally be attached to the extract tank, somewhere below the false bottom. The inverted P trap piping is attached to the brew tank near the bottom of the tank. The piping is shaped with an inverted P trap that rises above the false bottom but stays below the water level of the extract tank.

The pump piping is attached near the top of the brew tank. The pump piping is attached to the extract tank above the water level. The pump is attached so that it pumps water out of the brew tank and into the extract tank.

To brew coffee, coffee grounds are placed on the false bottom. The lid is placed on the extract tank. The mister is activated and the extract tank is filled with water up to a predetermined water level.

The brew tank it filled with water and sealed. The outlet on the extract tank is opened to allow a small amount of liquid out and the low flow pump is activated to prime the system.

The inverted P trap is lowered and the low flow pump is deactivated. The liquid is removed from the spout and the brew tank.

Process for Dry Hopping Beer

Figure 9:
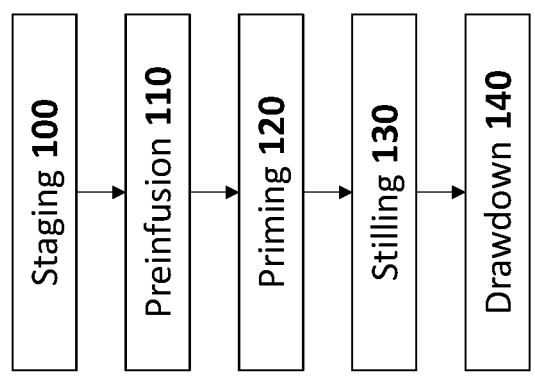
FIG. 9 is an overview of a process for dry hopping beer.

FIG. 9 illustrates a process for dry hopping beer. The process begins with staging the device 100. Next the hops are pre-infused 110. After that the device is primed 120. Next the beer is stilled 130. Finally the system is drawn down 140.

Figure 10:
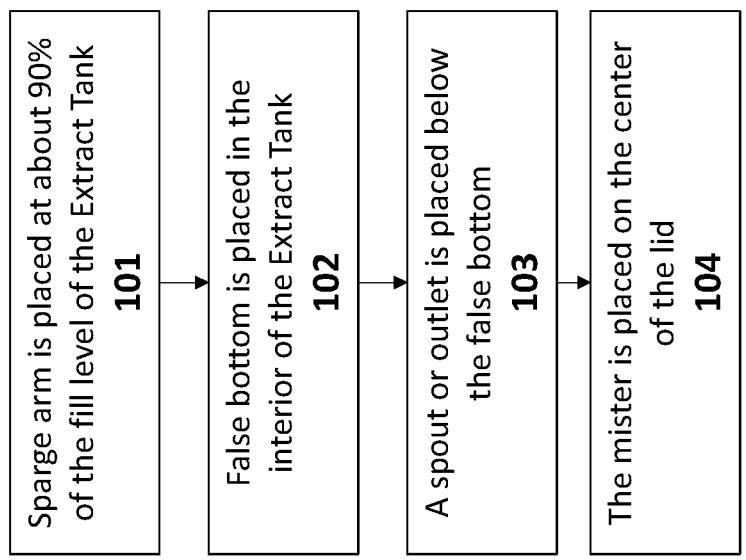
FIG. 10 is a staging process for dry hopping beer.

FIG. 10 illustrates a process for staging dry hopping beer. In this embodiment initially, a sparge arm 18 is placed at about 90% of the fill level of the extract tank 101, however another arm or valve may be used such as a float valve or a mister 24. A false bottom is placed in the interior of the extract tank 102. In this embodiment, a spout is placed on the extract tank below the false bottom 103, however in other embodiments another type of outlet may be used. Finally the mister is placed in the center of the lid for the extract tank.

Figure 11:
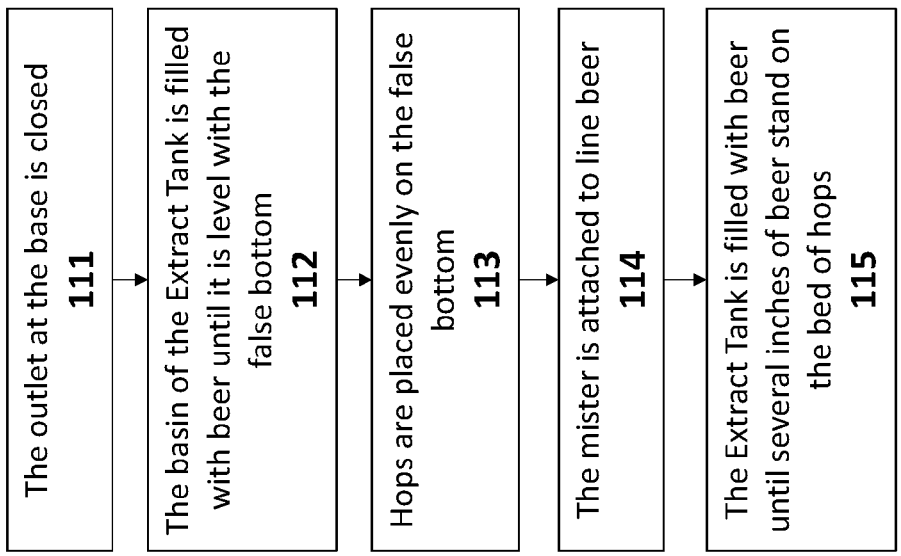
FIG. 11 is a pre-infusion process for dry hopping beer.

FIG. 11 illustrates a process of pre-infusing beer. First, the outlet 16 at the base of the extract tank 2 is closed 111. In this embodiment, the basin of the extract tank 2 is then filled with beer 112 until the beer is level with the false bottom 6. Hops are placed on the false bottom 6, 113. The mister 24 is attached to a beer source 114. The extract tank 2 is filled with beer until the beer level 3 is several inches above the hop bed 8, 115.

Figure 12:
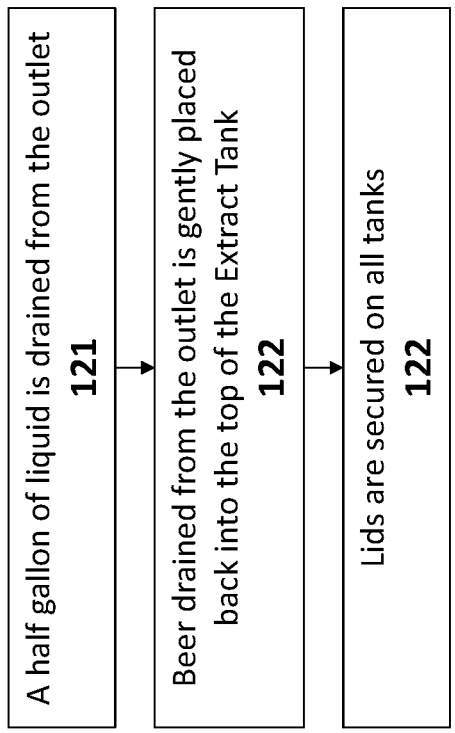
FIG. 12 is a priming process for dry hopping beer.

FIG. 12 illustrates a process for priming the device. Beer is drained from the extract tank 2 using the outlet 16, 121. The beer drained from the outlet 16 is placed back into the extract tank 2, 122. The lid is placed on the Extract Tank 2, 123.

Figure 13:
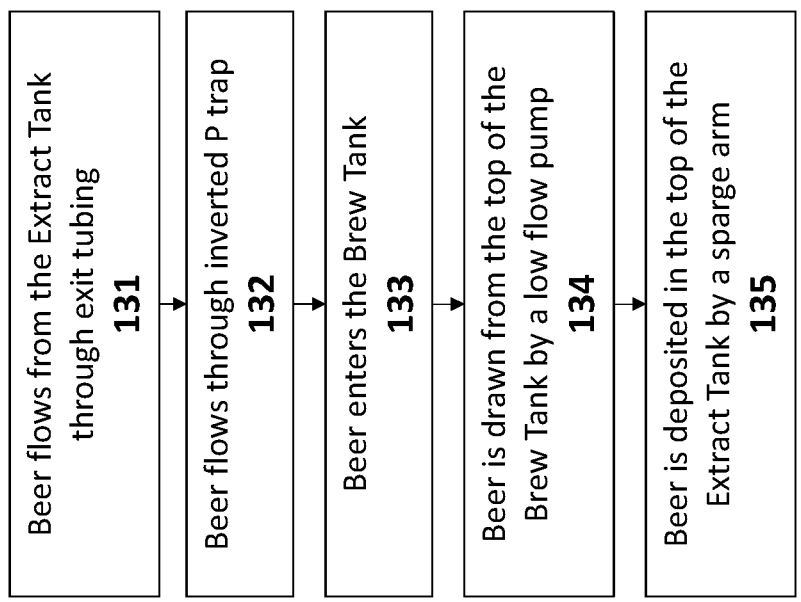
FIG. 13 is a stilling process for dry hopping beer.

FIG. 13 illustrates a process for coffee stilling beer. The Brew Tank 4 must be placed below the extract tank 2. Beer flows out the exit tube 28 in the extract tank 2, 131. Part of the exit tubing includes a P trap 14. Liquid flows through the P trap 14. The P trap 14 keeps the coffee bed 8 saturated with beer. Beer enters the brew tank 4, 133. Liquid is drawn from the top of the brew tank 4, 134. In this embodiment of the device the beer is drawn by a low flow pump 20 set to a pulse setting, however in other embodiments the liquid can be drawn using other methods. It may be preferable to use a low flow pump 20 with a pulse setting to create a dwell time for better extraction. In this embodiment, beer is deposited 135 at the top of the extract tank using a sparge arm 18, however the beer may be deposited by other means as well.

Figure 14:
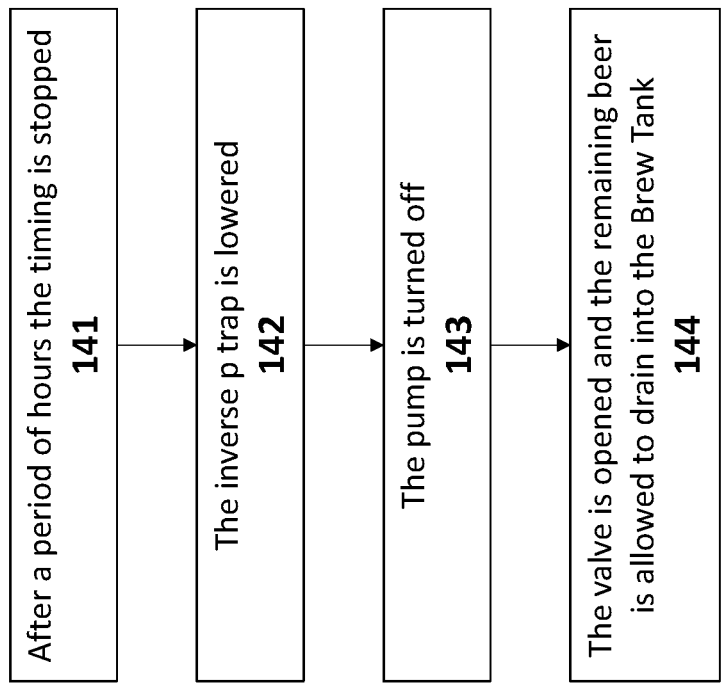
FIG. 14 is a drawdown process for dry hopping beer.

FIG. 14 illustrates a process for drawing down a dry hopping device. The period of time long enough to achieve the desired brew must elapse 141. Next the P trap 14 is lowered 142 and the pump 20 is turned off 143. Lowering the P trap 14 allows the liquid to drain directly into the brew tank 4. The valve 16 is opened 144 to allow any remaining beer to drain into the Brew tank 4.

Process for Infusing Liquid with Coffee

Figure 15:
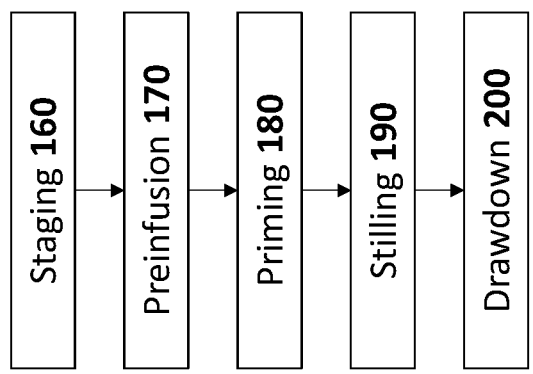
FIG. 15 is an overview of a process for infusing liquid with coffee.
Figure 16:
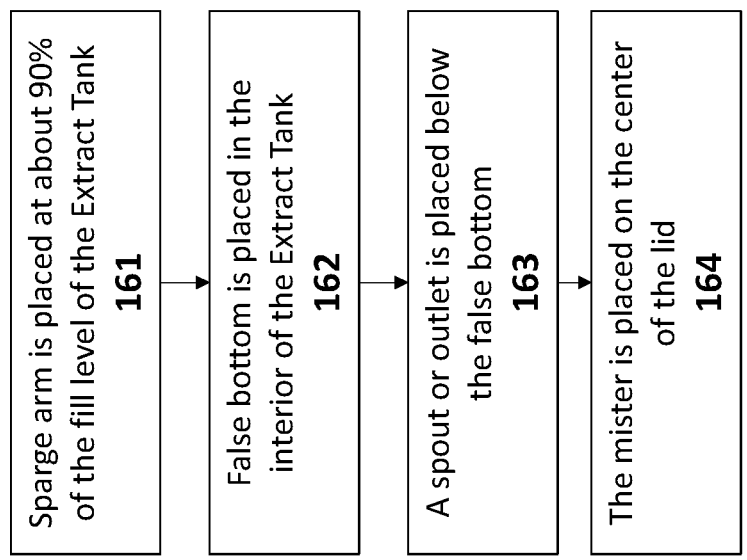
FIG. 16 is a staging process for infusing liquid with coffee.

FIG. 15 illustrates a process for infusing beer with coffee. In this embodiment beer is being infused with coffee, however in other embodiments other liquids can be infused with coffee or other infusible ingredients. The process begins with staging the device 160. Next the beer is pre-infused 170. After that the device is primed 180. Next the beer is stilled 190. Finally the system is drawn down 200.

FIG. 10 illustrates a process for staging coffee infusion. In this embodiment initially, a sparge arm 18 is placed at about 90% of the fill level of the extract tank 161, however another arm or valve may be used such as a float valve or a mister 24. A false bottom is placed in the interior of the extract tank 162. In this embodiment, a spout is placed on the extract tank below the false bottom 163, however in other embodiments another type of outlet may be used. Finally the mister is placed in the center of the lid for the extract tank.

Figure 17:
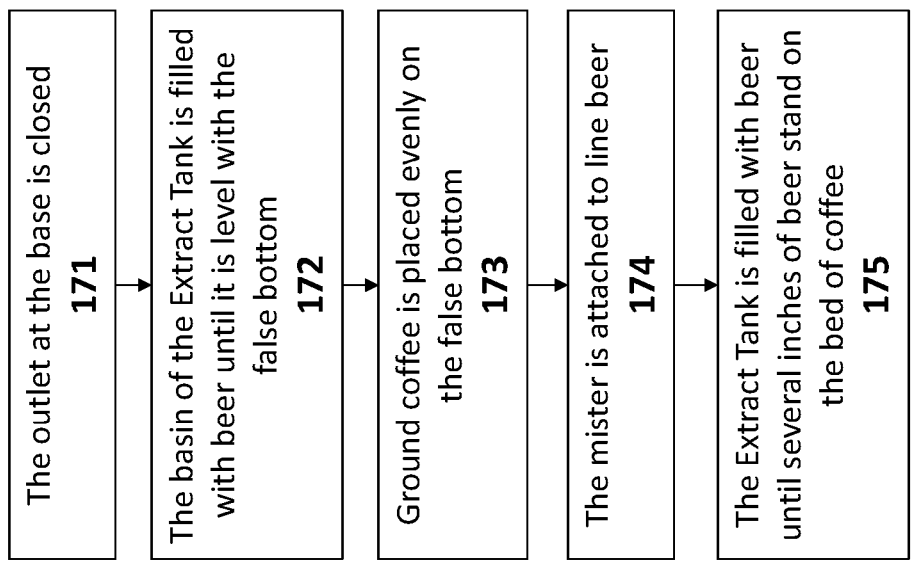
FIG. 17 is a pre-infusion process for infusing liquid with coffee.

FIG. 17 illustrates a process of pre-infusing beer. First, the outlet 16 at the base of the extract tank 2 is closed 171. In this embodiment, the basin of the extract tank 2 is then filled with beer 172 until the beer is level with the false bottom 6. Coffee grounds 8 are placed on the false bottom 6, 173. The mister 24 is attached to a beer source 174. The extract tank 2 is filled with beer until the beer level 3 is several inches above the coffee bed 8, 175.

Figure 18:
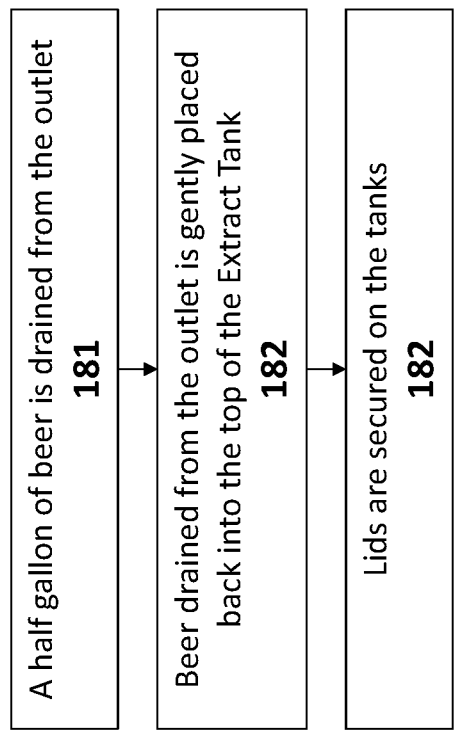
FIG. 18 is a priming process for infusing liquid with coffee.

FIG. 18 illustrates a process for priming the device. Beer is drained from the extract tank 2 using the outlet 16, 181. The beer drained from the outlet 16 is placed back into the extract tank 2, 182. The lid is placed on the Extract Tank 2, 183.

Figure 19:
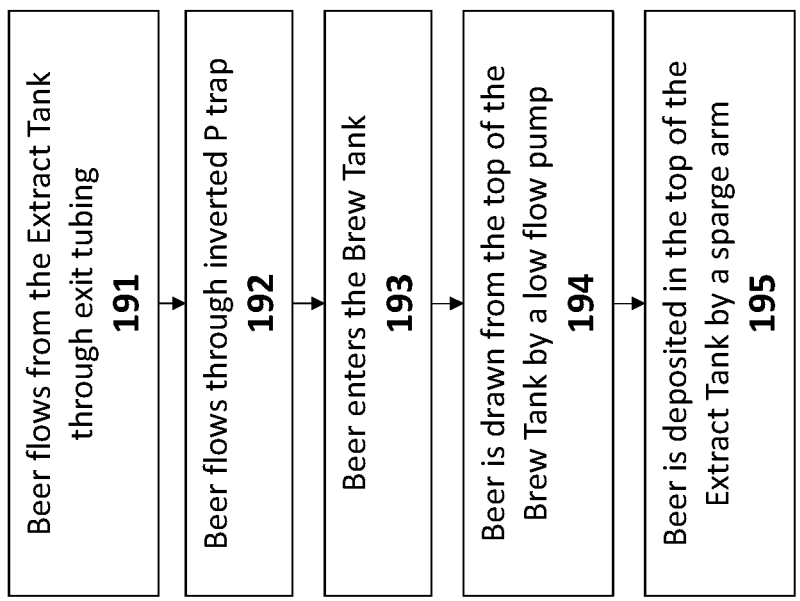
FIG. 19 is a stilling process for infusing liquid with coffee.

FIG. 19 illustrates a process for coffee stilling beer. The Brew Tank 4 must be placed below the extract tank 2. Beer flows out the exit tube 28 in the extract tank 2, 191. Part of the exit tubing includes a P trap 14. Liquid flows through the P trap 14. The P trap 14 keeps the coffee bed 8 saturated with beer. Beer enters the brew tank 4, 193. Liquid is drawn from the top of the brew tank 4, 194. In this embodiment of the device the beer is drawn by a low flow pump 20 set to a pulse setting, however in other embodiments the liquid can be drawn using other methods. It may be preferable to use a low flow pump 20 with a pulse setting to create a dwell time for better extraction. In this embodiment, beer is deposited 195 at the top of the extract tank using a sparge arm 18, however the beer may be deposited by other means as well.

Figure 20:
FIG. 20 is a drawdown process for infusing liquid with coffee.

FIG. 20 illustrates a process for drawing down a coffee infusion device. The period of time long enough to achieve the desired brew must elapse 201. Next the P trap 14 is lowered 202 and the pump 20 is turned off 203. Lowering the P trap 14 allows the beer to drain directly into the brew tank 4. The valve 16 is opened 204 to allow any remaining beer to drain into the brew tank 4.

Process for Cold Brewing Tea

Figure 21:
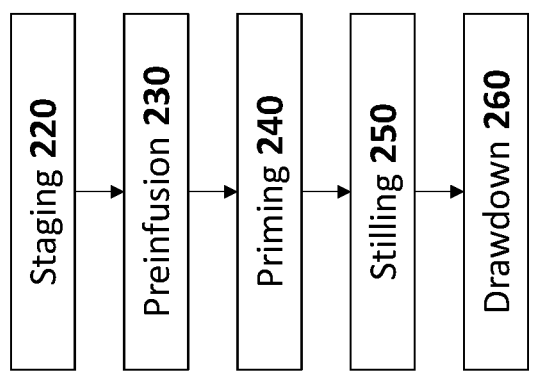
FIG. 21 is an overview of a process for infusing liquid with tea.

FIG. 21 illustrates a process for cold brewing tea. For this process to work correctly the tea used must not be in the form of a powder or fine particulate. The process begins by staging the device 220. Next the tea leaves are pre-infused 230. After that the cold brewing device is primed 240. Next the liquid is stilled 70. Finally the system is drawn down 80.

Figure 22:
FIG. 22 is a staging process for infusing liquid with tea.

FIG. 22 illustrates a process for staging a tea cold brew. In this embodiment initially, a sparge arm is placed at about 90% of the fill level of the extract tank 221, however another arm or valve may be used such as a float valve 18. A false bottom is placed in the interior of the extract tank 222. In this embodiment, a spout is placed on the extract tank below the false bottom 223, however in other embodiments another type of outlet may be used. Finally the mister is placed in the center of the lid for the extract tank.

Figure 23:
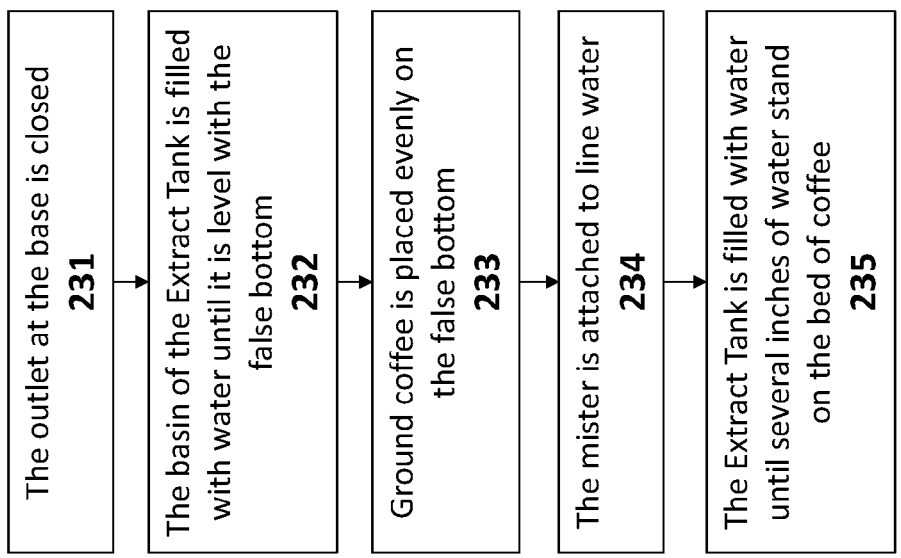
FIG. 23 is a pre-infusion process for infusing liquid with tea.

FIG. 23 illustrates a process of pre-infusing the liquid. First, the outlet 16 at the base of the extract tank 2 is closed 231. In this embodiment, the basin of the extract tank 2 is then filled with water 232 until the water is level with the false bottom 6, however in other embodiments others liquids such as beer or vodka could be used to be infused with tea. Tea leaves are placed on the false bottom 6, 233. The mister 24 is attached to a water source 234. The extract tank 2 is filled with water until the water level 3 is several inches above the tea bed 8, 235.

Figure 24:
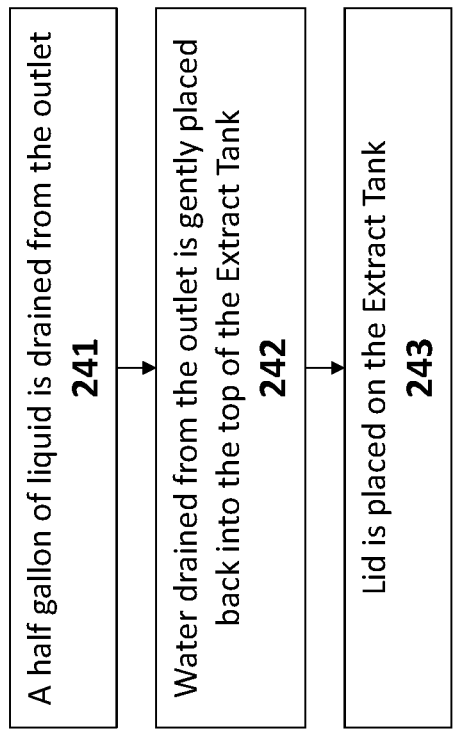
FIG. 24 is a priming process for infusing liquid with tea.

FIG. 24 illustrates a process for priming the cold brewing device. Liquid is drained from the extract tank 2 using the outlet 16, 241. The water drained from the outlet 16 is placed back into the extract tank 2, 242. The lid is placed on the Extract Tank 2, 243.

Figure 25:
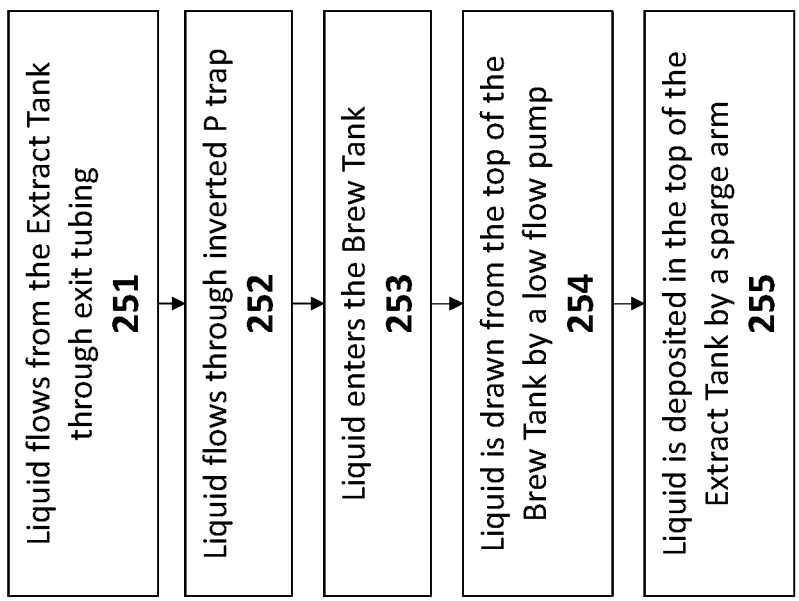
FIG. 25 is a stilling process for infusing liquid with tea.

FIG. 25 illustrates a process for stilling the liquid. The Brew Tank 4 must be placed below the extract tank 2. Liquid flows out the exit tube 28 in the extract tank 2, 251. Part of the exit tubing includes a P trap 14. Liquid flows through the P trap 14, 252. The P trap 14 keeps the tea bed saturated with water. Liquid enters the brew tank 4, 253. Liquid is drawn from the top of the brew tank 4, 254. In this embodiment of the device the liquid is drawn by a low flow pump 20 set to a pulse setting, however in other embodiments the liquid can be drawn using other methods. It may be preferable to use a low flow pump 20 with a pulse setting to create a dwell time for better extraction. In this embodiment, liquid is deposited 255 at the top of the extract tank using a sparge arm 18, however the liquid may be deposited by other means as well.

Figure 26:
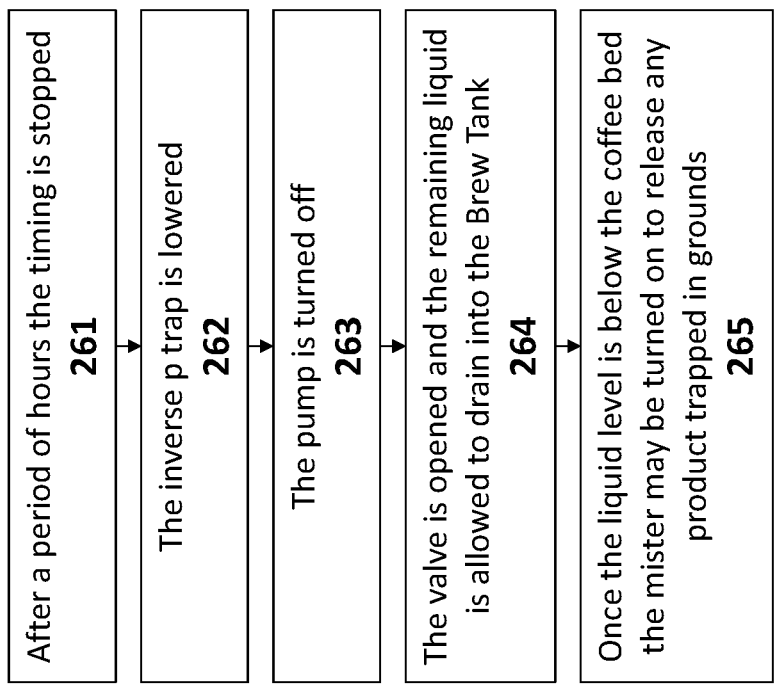
FIG. 26 is a drawdown process for infusing liquid with tea.

FIG. 26 illustrates a process for drawing down a cold brewing device. The period of time long enough to achieve the desired brew must elapse 261. Next the P trap 14 is lowered 262 and the pump 20 is turned off 263. Lowering the P trap 14 allows the liquid to drain directly into the brew tank 4. The valve 16 is opened 264 to allow any remaining in liquid to drain into the Brew tank 4. Once the liquid level is below the tea bed the mister 22 may be activated to release any product that may have been trapped in the grounds 265.

What is claimed is:
1. A method of brewing beverages comprising the steps of:
    staging a device;
    placing a false bottom in the extract tank;
    placing an outlet on the extract tank below the false bottom;
    placing a mister on the lid of the extract tank;

actuating a pre-infusion sequence further comprising the steps of:
  filling the extract tank with water until the water level is even with the false bottom;
  placing coffee grounds on the false bottom;
  attaching a mister to a water supply;
  placing the lid on the extract tank; and
  filling the tank until the water level is above the bed of coffee;
priming, further comprising the steps of:
  removing liquid from the extract tank through the outlet; and
  adding liquid through the top of the extract tank;
stilling, further comprising the steps of:
  flowing liquid from the extract tank, through inverted p trap piping, into a brew tank, through a low flow pump back into an extract tank; and,
actuating a drawdown sequence comprising lowering the inverse p trap and turning off the pump.

2. The method of claim 1 wherein staging includes placing a sparge arm at about 90% the fill level of the tank.

3. The method of claim 1 wherein the liquid pumped from the brew tank into the extract tank is pumped in a pulsing process.

\* \* \* \* \*